Patented Aug. 11, 1942

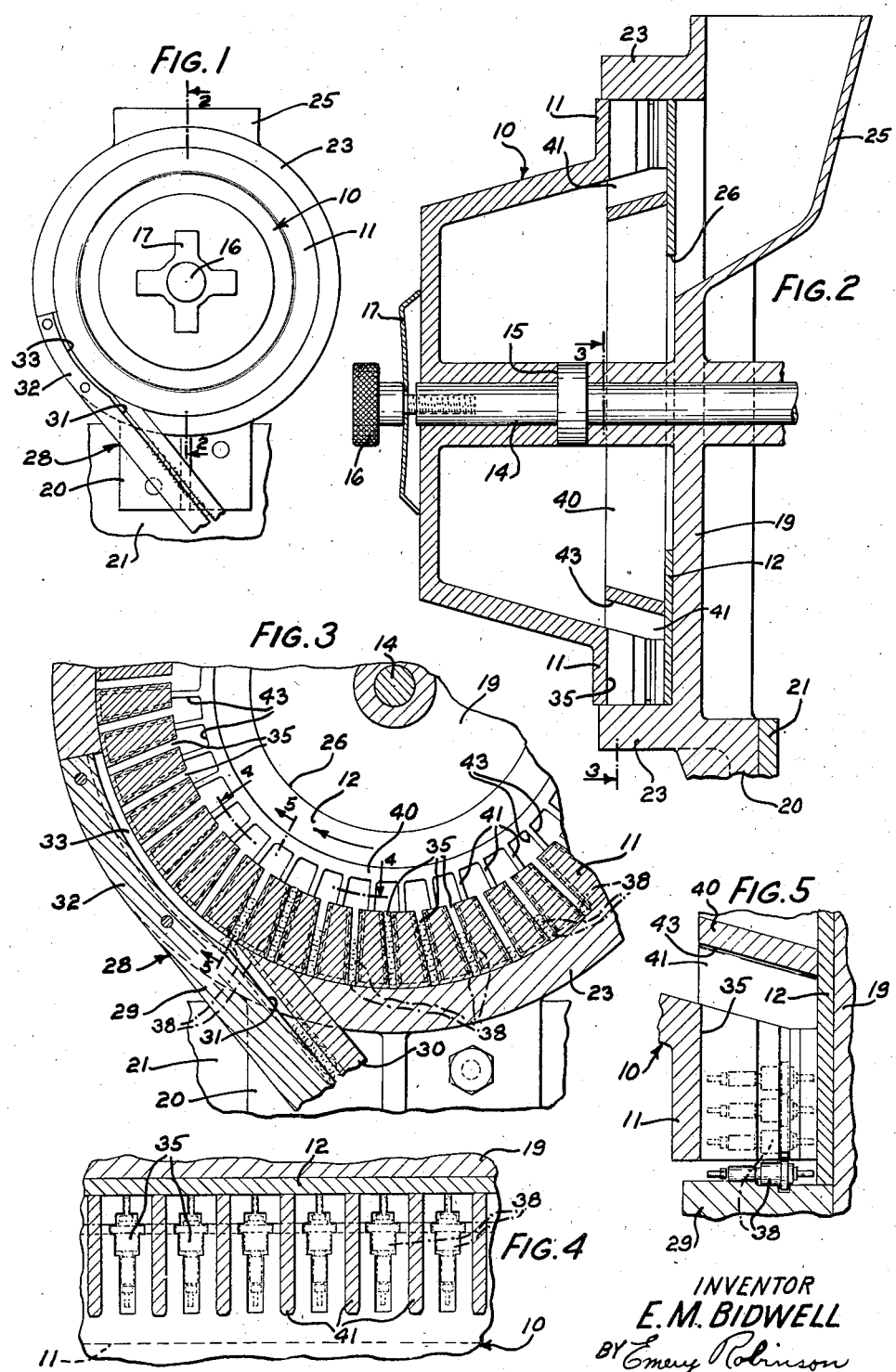

2,292,864

UNITED STATES PATENT OFFICE 2,292,864

APPARATUS FOR FEEDING ARTICLES

Edgar M. Bidwell, Clarendon Hills, Ill., assignor to Western Electric Company, Incorporated, New York, N. Y., a corporation of New York Application November 10, 1939, Serial No. 303,736

6 Claims. (Cl. 198—33)

This invention relates to apparatus for feeding articles, and more particularly to improvements in article feeding apparatus of the type comprising a rotary hopper having a plurality of pickup slots for feeding articles into a delivery chute.

An object of the invention is to improve the efficiency of article feeding apparatus of the type above referred to.

In accordance with this object, one embodiment of the invention contemplates the provision of an article feeding apparatus of the type referred to which is constructed and provided with means for preventing any of the articles within the hopper from straddling or otherwise clogging or obstructing the pick-up slots.

Other features and advantages of the invention will become apparent from the following detailed description when read in conjunction with the accompanying drawing, in which Fig. 1 is a front elevational view of an article feeding apparatus embodying the invention;

Fig. 2 is an enlarged vertical sectional view taken on line 2—2 of Fig. 1;

Fig. 3 is a fragmentary detail sectional view taken on line 3—3 of Fig. 2;

Fig. 4 is an enlarged fragmentary sectional view taken on line 4—4 of Fig. 3; and Fig. 5 is an enlarged fragmentary sectional view taken on line 5—5 of Fig. 3.

Referring now to the drawing, the apparatus illustrated therein comprises a rotary frusto-conical hopper 10, the smaller end of which is closed while the larger end thereof is formed with an annular flange or rim portion 11 to which there is attached an annular cover plate 12. The hopper is coaxially mounted upon a horizontal shaft 14 having a shoulder 15 against which the hopper is frictionally held by means of a screw 16 and an interposed spring washer 17. The shaft is journaled in a vertical plate 19 which is formed with a depending bracket portion 20 for attachment to a suitable fixed support, a portion of which is indicated at 21 in Figs. 1 and 3. The plate 19 is provided with a laterally projecting annular flange or race 23 within which the annular rim portion 11 of the hopper is adapted to rotate. The plate 19 is further provided or formed with a funnel-like portion 25 which communicates with the interior of the hopper through a central opening 26 in the cover plate 12. This construction permits reloading of the hopper without interrupting the operation of the apparatus.

As shown more clearly in Figs. 1 and 3, a portion of the annular race 23 is cut away to accommodate the upper end of an inclined delivery chute 28, which is attached to the supporting plate 19. The delivery chute comprises complementary sections 29 and 30, the adjoining surfaces of which are longitudinally grooved to provide an inclined passageway 31 for properly positioned articles. The left hand section 29 of the chute is formed at its upper end with an arcuate extension 32 which is spaced from the peripheral surface of the rim portion 11 of the hopper to provide a discharge passage 33 leading into the upper end of the chute.

The annular rim portion 11 of the hopper is provided with a series of circumferentially spaced pick-up slots 35, 35 which extend substantially radially from the interior to the exterior surfaces of the rim. These slots, as best shown in Fig. 4, are of a cross-section approximating the shape of the articles to be handled by the apparatus and are only slightly larger than the articles, so that only properly positioned articles are permitted to enter the pick-up slots. Upon rotation of the hopper in the direction indicated by the arrow in Fig. 3, the pick-up slots are successively advanced into registry with the arcuate discharge passage 33 so that the picked up articles slide down the pick-up slots and into the discharge passage which directs them into the delivery chute 28.

Rotary hoppers of the general type above referred to are well known in the art, but the prior art hoppers do not function entirely satisfactorily and efficiently, particularly when handling relatively long and irregularly shaped articles, such as multi-shoulder shafts 38, because of the tendency of such articles to straddle the pick-up slots and thus prevent other articles from entering the slots. The present invention eliminates this objection by providing means for preventing any of the articles from straddling or otherwise clogging or obstructing the entrance ends of the pick-up slots. This means, in the illustrated embodiment of the invention, comprises a baffle member in the form of an annular ring 40 which is concentrically secured within the slotted rim portion 11 of the hopper and is provided with a series of circumferentially spaced external ribs 41, 41. These ribs extend radially outward from the outer periphery of the ring and terminate at the inner surface of the hopper rim 11, one intermediate each pair of adjacent pick-up slots 35, as shown in Figs. 3 and 4. Thus, there is provided a series of individual tunnel-like passageways 43 for the passage of articles from the interior of the hopper to the pick-up slots. These passageways are of such width and depth that they permit only endwise movement of the articles toward the pick-up slots. Therefore, the articles are prevented from straddling and thereby clogging or obstructing the entrance ends of the pick-up slots.

In the operation of the apparatus, a supply of articles 38 is placed into the hopper 10 through the funnel 25, and upon rotation of the hopper, by any suitable means connected to the shaft 14, the mass of articles is agitated, whereby some of the articles are caused to move endwise into the passageways 43. Some of the articles which enter these passageways will be properly positioned to enter the pick-up slots 35, through which the articles will drop into the arcuate passage 33 which will direct them into the delivery chute 28 as explained above. Those articles which enter the passageways 43 but are not properly positioned, end for end, to enter the pick-up slots will slide out of the passageways as they are carried upwardly by the hopper.

It is to be understood that the invention is not limited to the particular embodiments thereof herein illustrated and described, except insofar as is defined by the appended claims.

What is claimed is:

1. In an apparatus for feeding articles, a rotary hopper having a series of pick-up slots for feeding properly positioned articles, and an externally ribbed annular ring within the hopper for providing a series of passageways for permitting the passage of only predeterminedly positioned articles to the entrance ends of the pick-up slots.

2. In an apparatus for feeding articles, a frusto-conical hopper having a series of pick-up slots for feeding predeterminedly positioned articles, an annular ring coaxially mounted within the hopper in spaced relation to the interior wall thereof, and means separating the annular space between said ring and said wall into a series of passageways for permitting the passage of only properly positioned articles to the entrance ends of the pick-up slots.

3. In an apparatus for feeding articles, a delivery chute, a frusto-conical hopper mounted for rotation about a horizontal axis and having a series of circumferentially spaced pick-up slots adjacent its larger end for the passage of properly positioned articles from the interior of the hopper into said delivery chute, and an externally ribbed annular ring coaxially mounted within the slotted end of said hopper for providing an annular series of passageways for guiding predeterminedly positioned articles to the entrance ends of said pick-up slots and for excluding improperly positioned articles from said slots.

4. In an apparatus for feeding articles, a delivery chute, a hopper comprising a frusto conical wall mounted for rotation about a horizontal axis and having a series of pick-up slots at one end thereof for the passage of properly positioned articles from the interior of the hopper into said delivery chute, a frusto conical baffle member concentrically mounted within the slotted end of said hopper in spaced relation to the interior surface of said wall, and means separating the annular space between said baffle member and said wall into a series of restricted passageways for permitting the passage of only predeterminedly positioned articles to the entrance ends of the pick-up slots.

5. In an apparatus for feeding articles, a rotary hopper having a series of pick-up slots for the passage of only predeterminedly positioned articles from said hopper, and means within the hopper for providing a series of restricted passageways, one for each pick-up slot, for the passage of only predeterminedly positioned articles from the interior of the hopper to the entrance ends of the pick-up slots, said passageways being constructed and arranged so that their axes are disposed at an angle to the axes of corresponding pick-up slots.

6. In an apparatus for feeding elongated articles, a delivery chute, a rotary hopper comprising an annular wall having a series of elongated pick-up slots for the passage of correspondingly shaped articles from said hopper into said delivery chute, said pick-up slots being constructed and arranged to permit the passage therethrough of only predeterminedly positioned articles, and means within the hopper adjacent the entrance ends of the pick-up slots for providing a series of restricted passageways, one for each pick-up slot, for guiding articles from the interior of the hopper to the entrance ends of said pick-up slots, said passageways being arranged so that their axes are disposed at approximately right angles to the axes of corresponding pick-up slots, and said passageways being designed to permit only endwise movement of the articles therethrough, whereby straddling and consequent obstruction of the entrance ends of the pick-up slots by the articles is avoided.

EDGAR M. BIDWELL.